March 11, 1924.  1,486,620

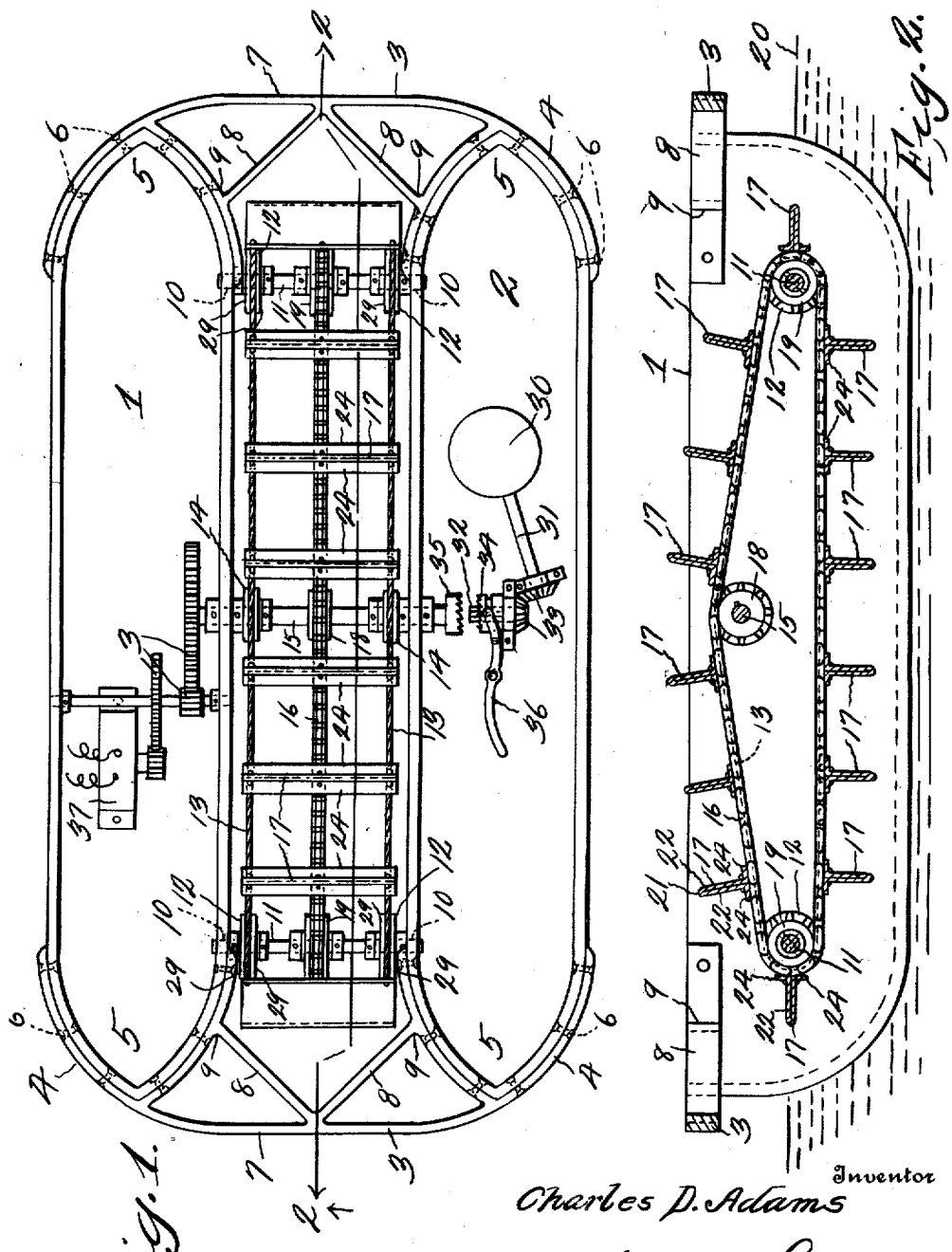

C. D. ADAMS

DIVIDED HULL VESSEL

Filed Feb. 1, 1922   2 Sheets-Sheet 2

Inventor
Charles D. Adams
By Philip A. H. Ferrell
His Attorney

Patented Mar. 11, 1924.

1,486,620

UNITED STATES PATENT OFFICE.

CHARLES D. ADAMS, OF ST. AUGUSTINE, FLORIDA.

DIVIDED-HULL VESSEL.

Application filed February 1, 1922. Serial No. 533,161.

*To all whom it may concern:*

Be it known that CHARLES D. ADAMS, citizen of the United States, residing at St. Augustine, in the county of St. John and State of Florida, has invented certain new and useful Improvements in Divided-Hull Vessels, of which the following is a specification, reference being had therein to the accompanying drawings.

The invention relates to divided hull vessels and has for its object to provide a vessel comprising spaced hulls in parallel relation to each other, the ends of said hulls being connected together by yokes which yokes arch the ends of the vessels and are braced by angularly disposed brace bars. Also to provide between the hulls an endless belt extending around rollers and sprockets, said belt comprising a centrally disposed drive chain, side cables, said side cables and centrally disposed drive chains having secured thereto spaced transversely disposed paddles, which travel longitudinally engaging the water, thereby forcing the vessel forwardly or rearwardly.

A further object is to form the paddles from sheet iron, each paddle being T-shaped in transverse cross section and formed by bending sheet material on itself and flanging the ends of the sheet to the same plane. Also to provide apertures in the flanges and registering apertures in the body of the paddle adjacent its ends, and through which apertures the cables pass, thereby holding the paddles on the cables against slipping, and at the same time allowing the cables to easily pass over the flanged guide rollers.

A further object is to provide means whereby when the vessel is tied to a dock or the like, the current of the stream may be utilized for moving the paddles and electricity generated for lighting or other purposes aboard the vessel.

A further object is to provide the vessel with an engine whereby the vessel may be propelled through the medium of the paddles.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the vessel.

Figure 2 is a longitudinal sectional view through the vessel taken on line 2—2 of Figure 1.

Figure 3:
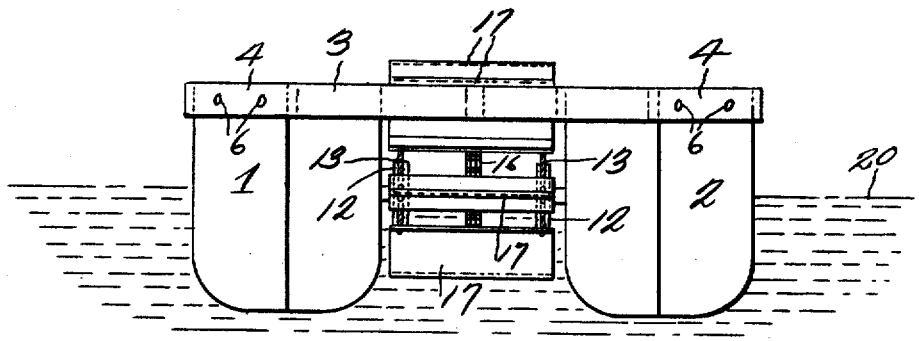
Figure 3 is a front elevation of the vessel.

Referring to the drawings, the numerals 1 and 2 designate spaced hulls in parallel relation to each other, which hulls at their ends are connected together by means of yokes 3. The yokes 3 are provided with ogival shaped members 4, which receive the ends 5 of the hulls 1 and 2 and are secured to said ends by means of rivets 6. Extending inwardly and diverging from each other from the transverse portions 7 of the yokes 3 are braces 8, which braces brace the hulls especially on strains on any of the quarters of the hulls. The braces 8 merge into the inner sides of the ogival-shaped members 4 at 9. It will be seen that the yokes 3 connect the hulls 1 and 2 together rigidly and brace the hulls in relation to each other. Rotatably mounted in bearings 10 in the inner sides of the hulls 1 and 2 are shafts 11, which shafts are provided with flanged pulleys 12 which are rotatably mounted thereon, and around which pulleys cables 13 extend. The cables 13 pass over pulleys 14 rotatably mounted on the transversely disposed drive shaft 15. It will be seen that as the drive shaft 15 is rotated, that the cables 13 which are endless, move according to the direction of movement of the shaft 15. However the positive movement of the cables 13 is insured by the connection thereof to the drive chain 16 through the medium of the transversely disposed paddles 17. The drive chain 16 extends over a drive pulley 18 carried by the drive shaft 15 and over idle sprockets 19 rotatably mounted on the shafts 11. Thus it will be seen that when the drive shaft 15 is rotated that the paddles 17 which are disposed below the water line 20 of the vessel will engage the water and force the vessel forwardly or rearwardly according to the direction of rotation of the shaft 15. It will be seen that the driving mechanism is disposed between the hulls thereby maintaining the vessel on an even keel, and at the same time disposing the propelling means of the vessel where it will not interfere with the vessel going along side of a dock.

Figure 4:
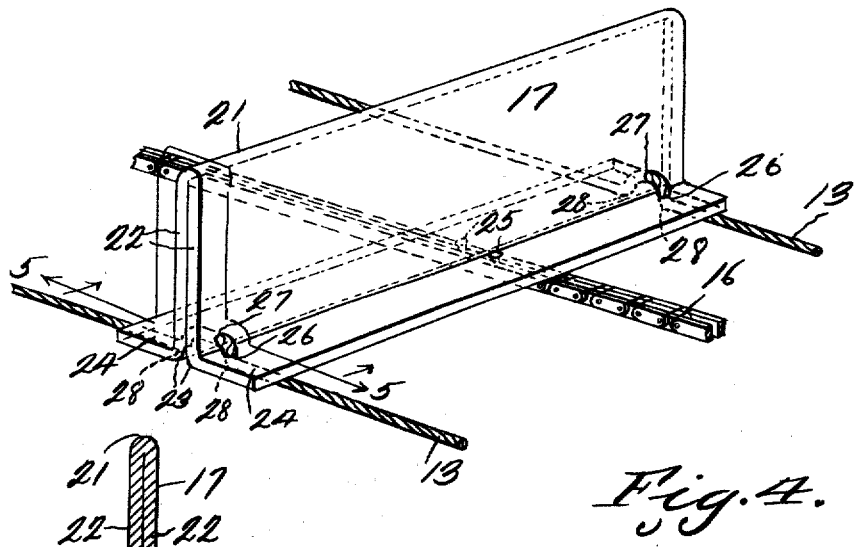
Figure 4 is a perspective view of one of the paddles.
Figure 5:
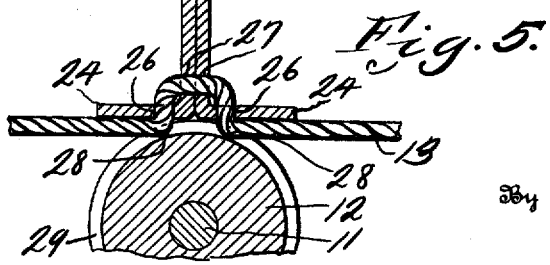
Figure 5 is a vertical transverse sectional view through one of the paddles, taken on line 5—5 of Figure 4.

The paddles 17 are formed from a single sheet of material bent to a T-shape as shown in Figures 4 and 5. The sheet is bent upon itself as at 21, thereby forming engaging members 22, the lower ends of which are again bent at 23, thereby forming outwardly extending flanges 24 which are in the same plane. The flanges 24 rest upon the cables 13, and the drive chain 16, and are secured to the drive chain 16 at 25 substantially centrally of the paddles. The cables 13 pass through apertures 26 in the flanges 24, and thence through registering apertures 27 in the members 22. It will be seen that right angle bends are in the cables 13, which bends prevent slipping of the paddles 17 on the cables and at the same time obviate the use of clamping members for securing the paddles to the cables, which clamping members would interfere with the passage of the cables 13 over the idle pulleys 12 and 14.

It will be seen that when the corners 28 of the cables 13 reach the pulleys they will pass between the flanges 29 thereof, and at the same time the cables will not interfere with the passage of the paddles 17 around the pulleys 12, sprockets 19, pulleys 14 and the sprocket 18. When the paddles 17 are in their lowered driving position the flanges 24 of the paddles will engage the cables 13 and drive sprocket 16, thereby maintaining the paddles 17 in vertical positions during the driving operation.

The drive shaft 15 is driven from an engine 30 through the shaft 31, which shaft is connected to the shaft 32 by means of bevel gears 33. Feathered on the shaft 32 is a clutch member 34, which clutch member, when thrown into engagement with clutch member 35 by means of the lever 36, allows power to be transmitted from the engine 30 to the drive shaft 15, thereby driving the sprocket chain 16, and the propelling mechanism.

Disposed on the hull 1 is a motor generator 37, which generator is driven by the drive shaft 15 through a gear train 38. It will be seen that the motor generator may generate current for various purposes on the vessel, such for instance as the lighting circuit, operation of capstans, hoisting apparatus or for any other purpose. When the device is in a stream where there in a current and is tied to the dock or anchored in the stream, it is obvious that the motor generator 37 may be operated when the clutch members 34 and 35, which connects the drive shaft 15 with the engine 30 are out of engagement, thereby allowing the lighting circuit of the ship to be maintained and auxiliary machinery operated through the medium of electric current to be maintained in operation.

From the above it will be seen that a divided hull vessel is provided, which is simple in construction, the hulls rigidly held and braced together and a propelling means provided for the vessel which is protected, and which may be utilized for operating auxiliary machinery or lighting circuits through a motor generator.

The invention having been set forth what is claimed as new and useful is:—

1. The combination with an endless propelling means for vessels, said propelling means comprising an endless sprocket chain extending over spaced sprockets, endless cables extending over flanged pulleys in axial alignment with the sprockets, of transversely disposed paddles connected to said sprocket chain and cables, said paddles being T-shaped in cross section and having their opposite flanges in the same plane and in engagement with the chain and cables, said cables extending through apertures in the flanges of the paddles and through apertures in the main body of the paddles adjacent the inner sides of the flanges.

2. The combination with an endless propelling means for vessels, said propelling means comprising a centrally disposed driven sprocket chain and cables, said sprocket chain passing over sprockets, said cables passing over flanged pulleys, of transversely disposed paddles carried by said chain and cables, said paddles being T-shaped in cross section and having their opposite flanges in engagement with the sprocket chain and cables, said cables extending upwardly through apertures in the opposite flanges adjacent the inner sides thereof and transversely through apertures in the main body of the paddles adjacent the flanges.

3. The combination with endless cables of the propelling mechanism for vessels, of a transversely disposed paddle carried by said cables, said paddle being T-shaped in cross section and formed from a single sheet of metal bent upon itself to form the main body of the paddle and having its end terminating in oppositely extending flanges, said cables being connected to the paddle by extending upwardly through apertures in the oppositely extending flanges adjacent the main body of the paddle and through registering apertures in the body of the paddle adjacent the first mentioned apertures.

In testimony whereof I hereunto affix my signature.

CHARLES D. ADAMS.